MODULATOR BINARY COUNTER CIRCUIT
Filed March 7, 1955
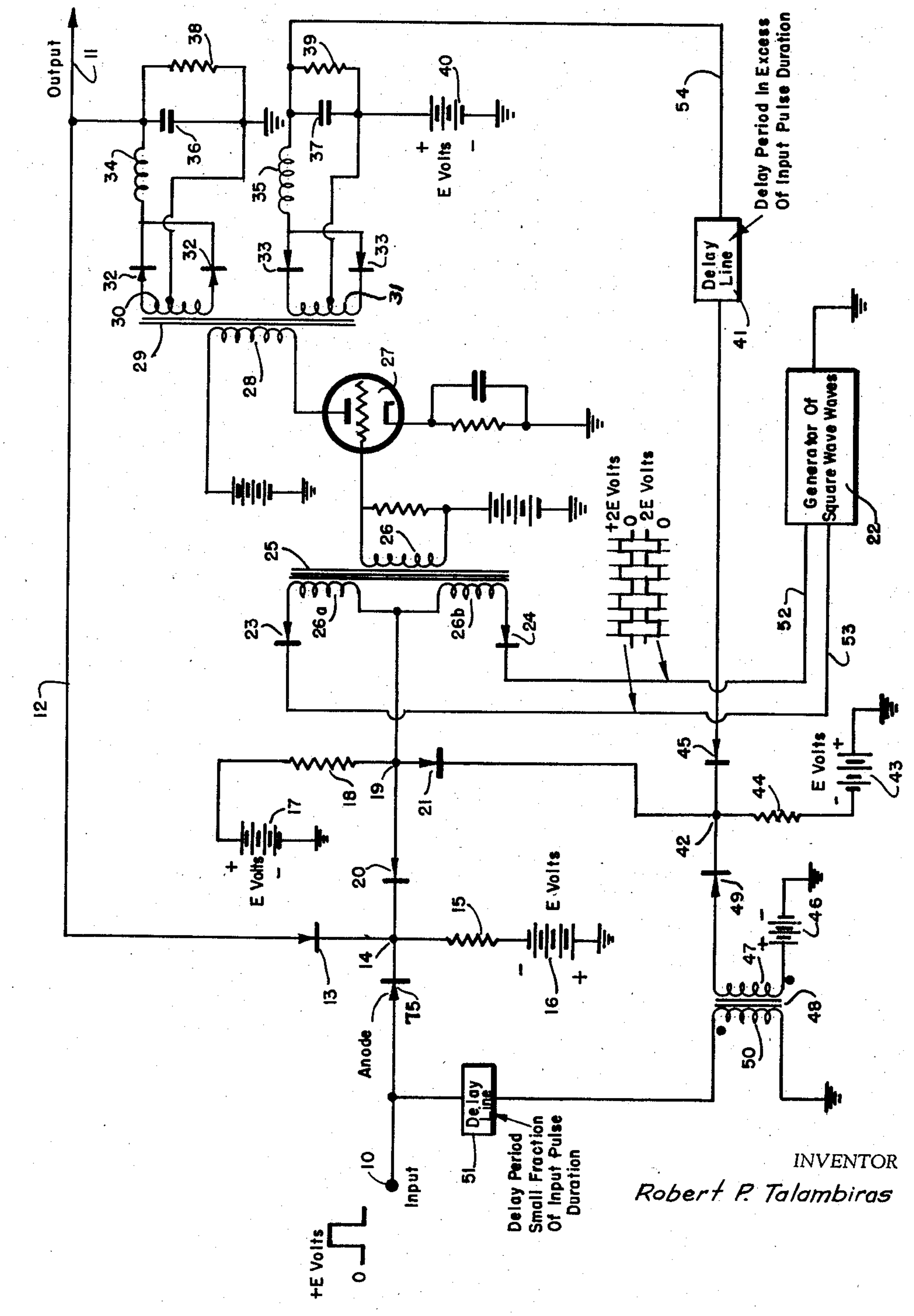
INVENTOR
Robert P. Talambiras

United States Patent Office 2,888,560

Patented May 26, 1959

2,888,560

MODULATOR BINARY COUNTER CIRCUIT

Robert P. Talambiras, Cambridge, Mass., assignor to Sperry Rand Corporation, New York, N.Y., a corporation of Delaware Application March 7, 1955, Serial No. 492,625

13 Claims. (Cl. 250—27)

This invention relates to counter circuits of the type used in electronic computers and more particularly to counter circuits in which a high frequency carrier wave is modulated to control the circuit.

A primary object of this invention is to provide an improved counter circuit for electronic computers.

Another object of the invention is to provide a counter circuit having improved reliability.

A further object of the invention is to provide a circuit that is suitable for higher speed work than has heretofore been practically possible.

An additional object of the invention is to provide a counter circuit for use in an electronic computer, capable of greater effective gain than has heretofore been achieved in such circuits.

Another object of the invention is to provide a counter circuit for use in an electronic computer in which the effect of transients is minimized.

Briefly speaking the invention in its preferred form employs a flip-flop circuit of the high frequency modulator type. This flip-flop circuit is in combination with control means, responsive to the input signals as well as to the output of the flip-flop circuit, to control the latter so that there is one output pulse for every two input pulses. The following description explains the counter in more detail so that the novel features will clearly appear.

The drawing is a schematic diagram of the invention.

In the drawing, the device has a conventional input 10 and a conventional output 11. There is a feedback path 12 from the output 11, operating through a rectifier 13, to junction 14. The latter junction is fed from input 10 through rectifier 75. Junction 14 is connected through resistor 15 to a source of potential 16 having —E volts. A second battery 17 operating through resistor 18 may hold junction 19 at +E volts when rectifiers 20 and 21 are cut off. Generator 22 has a center tapped output for producing square wave alternating currents which have relative magnitudes and phases as shown in the drawing. The center tap of generator 22 is grounded. The square wave alternating current output of generator 22 is impressed on the cathodes of rectifiers 23 and 24, the anodes of which are connected to opposite ends of the center tapped primary *26a* and *26b* of transformer 25. The two halves of the primary windings are respectively designated by reference numbers *26a* and *26b*. The secondary winding 26 of transformer 25 feeds the grid of triode 27 which has suitable bias and other characteristics whereby it preferably operates as a class A amplifier, although it could operate as class B or class C. A transistor type amplifier could be used if desired. The output of the triode 27 is fed to primary winding 28 of transformer 29. This transformer has two secondary windings 30 and 31 which supply currents to full wave rectifying circuits 32 and 33. The rectifying circuits produce direct current outputs which are fed through inductors 34 and 35, respectively, to filter condensers 36 and 37 respectively. Bleeder output resistors 38 and 39 may be employed if desired. Inductor 34 and condenser 36 act as a filter to smooth out the rectified alternating currents and produce filtered direct current. The same may be said for inductor 35 and condenser 37. Battery 40 holds the lower end of resistor 39 at a potential of E volts above ground and when there is an output in secondary 31, it produces a potential of E volts across resistor 39 which has such polarity as to cancel the effect of battery 40 upon the wire 54. When a positive pulse flows through delay line 41 and rectifier 45, the junction 42 may be raised to +E volts. Moreover, the battery 46 operating through secondary 47 of transformer 48 and rectifier 49 may normally hold junction 42 at E volts above ground; however, when an input pulse, suitably delayed, flows through primary 50 of transformer 48 and induces a potential in secondary 47, such potential is equal to E volts and is in a direction opposite the potential of battery 46 so as to cancel the potential of battery 46 and thus prevent the latter from raising the potential of junction 42. Primary 50 is fed from the input 10 through a delay line 51. The frequency of the alternating current source 22 may be any frequency within a very wide range but in any case the input signals at input 10 are normally long compared to the period of each cycle of the alternating current.

It is understood that while a number of batteries are shown, in a practical circuit the potentials would be derived from a single power supply and the batteries are illustrated merely to avoid complicating the circuit by showing the connections to the power supply.

A counter circuit in an electronic computer is intended to produce one output pulse (in this case an output 11) for every two input pulses received (in this case at input 10). It will now be explained how this particular counter circuit performs that function. The apparatus has two stable states of operation. In one stable state there is an output at 11 and in the other stable state there is no output at 11. Assuming the first of these two stable states, the junction 19 is held at +E volts by the battery 17 through resistor 18. Therefore, the center tap of the primary of transformer 25 is raised to +E volts. Consequently, whenever the wire 52 drops below E volts, current may flow through rectifier 24, and likewise whenever wire 53 drops below E volts current may flow through rectifier 23; provided of course point 19 remains raised to +E volts. In that case, on alternate half cycles there will be a flow of current through primary *26a* and on the remaining half cycles there will be a flow of current through primary *26b*. This will cause current to be induced in the secondary 26, which will be amplified by amplifier 27 and fed into primary 28 of transformer 29. Consequently alternating currents will appear in the secondaries 30 and 31 and will be rectified by rectifiers 32 and 33. The alternating currents will be filtered by filters 34—36 and 35—37, hence steady direct currents will appear across resistors 38 and 39; whereby the output at 11 will rise above ground potential and the wire 54 connected to the upper end of resistor 39 will assume ground potential. The latter takes place since the potential of battery 40 is equal and opposite to that across resistor 39 and the two potentials cancel each other. Consequently, the potential on wire 12 will be raised to E volts above ground and the potential of junction 14 will therefore be held at E volts above ground. Well after termination of the input pulse at input 10, the potential at the anode of rectifier 45 will be zero and the potential at the anode of rectifier 49 will be +E volts due to the battery 46, and therefore point 42 will be raised to +E volts. A potential of 2E volts will appear across resistor 44 and the positive potential of battery 46 impressed through rectifier 49 upon the cathode of rectifier 21 will hold that cathode at +E volts and thus cut off that rectifier, enabling battery 17 to hold point 19 at +E volts. The apparatus will remain in this "first" stable state until a pulse is received at the input 10.

Assume now that a positive pulse is received at input 10 of a value +E volts. It will tend to raise the anode of rectifier 75 to +E volts but no current will flow through that rectifier since its cathode and point 14 are already at +E volts and therefore the input pulse will have no effect upon junction 14. That input pulse will, however, flow through the delay line 51 (which provides a very short delay) to the primary 50 of transformer 48 and will induce a potential in the secondary 47 which cancels the potential of battery 46 and reduces the potential of the anode of rectifier 49 to zero. Since the anode of rectifier 45 is also at zero volts, the junction 42 now drops to essentially ground potential and draws with it junction 19 which likewise drops to ground potential. There is now a flow of current from ground through battery 17, resistor 18, rectifier 21, resistor 44, battery 43, to ground. The potentials of batteries 17 and 43 are both E volts and the resistors 18 and 44 are substantially equal so that E volts appear across resistor 18 and E volts likewise appear across resistor 44, leaving junction 19 at ground potential. Therefore, the current flow in primaries 26*a* and 26*b* is cut off, since the wires 52 and 53 always move from zero to a positive potential and never go negative. These wires are connected to the cathodes of rectifiers 23 and 24 and hence these rectifiers remain cut off during this stable state of the operation. Therefore, there is no alternating current in secondary 26, the amplifier 27 is turned off and there is no alternating current in primary 28. Hence, there is no current in secondaries 30 and 31 and no potential across resistor 38. Since there is no current induced in secondary 31, the potential which normally cancelled that of battery 40 has ceased and the full potential of E volts of battery 40 is now impressed on wire 54. The potential at the input of delay line 41 therefore abruptly rose to +E volts when the circuit shifted to its second stable state. Delay line 41 has a delay preferably slightly longer than the duration of the input pulses, fed to the input 10 and consequently at a time a little later than the conclusion of the input pulse the potential on the anode of rectifier 45 rose to +E volts and carried with it the junction 42 so that the rectifier 21 was again cut off. However, in the meanwhile the feedback potential on feedback wire 12 ceased and at the conclusion of the input pulse the junction 14 no longer was held positive by the presence of a positive potential at input 10. Therefore the negative potential of battery 16 operating through resistor 15 drops the potential of junction 14 to ground potential. There is now a flow of current from ground through battery 17, resistor 18, rectifier 20, resistor 15 and battery 16, to ground. The batteries 16 and 17 have equal and opposite potentials and the resistors 15 and 18 are of substantially equal resistance; therefore junctions 14 and 19 are held at ground potential and the device will remain in this stable state at which there is no signal at output 11 until another input pulse is received at input 10.

The delay line 51 produces a very short delay, preferably a small fraction of the width of the input pulses fed to input 10. When the device is in its aforesaid first stable state, that is junction 19 is raised to E volts above ground and the output 11 is producing feedback through rectifier 13 and holding junction 14 at +E volts, the apparatus is ready to be shifted to its second stable state by a pulse received at input 10. This pulse at input 10 of course tends to hold the junction 14 above ground potential for the duration of the input pulse. It is desirable that point 42 be held at ground potential for a time period after the input 10 is no longer holding the junction 14 at a positive value. This insures that the input pulse does not flip the device back to its first stable state, a thing that could conceivably happen if junction 14 remained positive after point 42 returned to a positive value which it will do following cessation of induction of current in secondary 47. The delay line 51 operates to delay the flow of the input pulse through primary 50 and therefore delays the cancellation of the potential of battery 46. Therefore, even subsequent to the termination of an input pulse at input 10, the secondary 47 is cancelling the effect of battery 46 and up to the end of this short interval of time the potential of point 19 is zero by reason of a flow of current from ground, battery 17, resistor 18, rectifier 21, resistor 42, and battery 43. At the start of said short interval of time (after the input pulse at input 10 has ceased and prior to the termination of induced potential in secondary 47), the junction 14 drops to ground potential by reason of cessation of the input pulse at input 10. During said short interval of time, the current flow through battery 17 and resistor 18 is switched from flowing through rectifier 21 to flowing through rectifier 20, resistor 15 and battery 16, to ground, the path which it maintains throughout the second stable state of the operation of the device.

The second input pulse at input 10 will pass through rectifier 75 and raise the junction point 14 to +E volts and thus cut off the rectifier 20. The full potential of battery 17 will now be impressed on junction 19 since as hereinafter explained delayed current passing through delay line 41 will hold the potential of junction 42 positive during the period of time required for the input pulse to flow through the delay line 51. After flow of current in secondary 47 (due to the second input pulse) has ceased the potential at the anode of rectifier 49 will again rise to +E volts and will continue to hold the cathode of rectifier 21 at +E volts. The delay line 41 continues to produce delayed current at anode 45 until (and preferably for a short time after) the potential at the anode of rectifier rises as heretofore explained.

The function of delay line 41 will now be explained in more detail. It is necessary that point 42 remain at +E volts throughout the entire time that the apparatus is in its first stable state, since if this point is allowed to drop to ground potential, as it normally would do if both rectifiers 45 and 49 were cut off, the junction 19 would drop to ground potential and tend to place the device in its second stable state. For a short interval just after the circuit is flipped to its first stable state the potential of point 42 would fall if the delay line 41 was not present. This fall in potential would occur by reason of cancellation of the potential of battery 46 by reason of induction of potential in secondary 47. However, the delay line 41 delays the fall in potential at the anode of rectifier 49, occurring in response to the input pulse, until after the current induced in secondary 47 has ceased. It follows that the junction 42 is held at +E volts throughout the entire time that the counter circuit is in its first stable state.

I claim to have invented:

1. In a counter circuit; a flip-flop circuit having set and reset inputs and means for flipping the flip-flop circuit to one stable state when the set input is alone energized and for flipping the flip-flop circuit to another stable state when a predetermined potential appears at the reset input; first biasing means tending to bias the reset input to said predetermined potential; second biasing means tending to bias the reset input away from said predetermined potential and which is capable of overcoming the opposing biasing effect of the first biasing means; input means which in response to an input signal energizes the set input and also cancels the effect, on said reset input, of the second biasing means; and means including a delay line and operable when the device is in said other stable state to apply a further bias through said delay line to the reset input to overcome the effect of the first biasing means throughout that part of the period of the said one stable state during which the flipping input signal is being received.

2. In combination; a flip-flop circuit comprising means including a source of alternatnig current, said means producing an alternating current when one point of the circuit is held at a predetermined potential and which does not produce the alternating current when that point is held at another potential, rectifier means for rectifying the alternating current produced by the last-named means, feedback means fed from the output of the rectifier means for holding said point at said predetermined potential and first bias means tending to bias said point to said predetermined potential; second bias means tending to bias said point to said other potential; third bias means which normally overcomes the bias of the second bias means and tends to hold said point at said predetermined potential; input means which in response to a signal at the input produces a pulse additive to the effect of the feedback means and which cancels the effect of the third bias means; and means responsive to the absence of rectified current in the rectifier means for producing a potential that will hold said point to said predetermined potential for a sufficient limited time after rectified current appears in the rectifier means to prevent instability of the circuit.

3. In a counter circuit; a first junction, an input, a first rectifier having its anode connected to the input and its cathode connected to said first junction, means biasing said first junction negatively, a second junction, a second rectifier having its anode connected to the second junction and its cathode connected to the first junction, a third rectifier having its anode connected to the second junction, means biasing the second junction positively, means biasing the cathode of the third rectifier negatively, all three of said biasing means including high resistance, means for biasing the cathode of the third rectifier positively, means responsive to a pulse at the input for cancelling the effect of the last-named biasing means, means responsive to the potential of the second junction for producing an alternating current when the second junction is positive and having no alternating current output when the second junction is not positive, rectifier means for rectifying the alternating current, feedback means for rendering the first junction positive in response to flow of rectified current in the rectifying means, means for producing a positive direct current potential when none exists in the rectifying means and producing no potential when rectified current is present in the rectifying means, and means including a delay line connecting the last-named means to the cathode of the third rectifier for holding the second junction at a positive value for a limited time after the circuit assumes the stable state in which the potential of the second junction is positive.

4. A counter circuit as defined in claim 3 in which the means responsive to a pulse at the input for cancelling the effect of the means for biasing the cathode of the third rectifier includes delay means whereby its action is delayed following receipt of an input signal.

5. A counter circuit as defined in claim 4 in which the feedback means includes a half wave rectifier the cathode of which is connected to the first junction.

6. In a counter circuit, a flip-flop circuit including means for holding the circuit in one stable state in response to a predetermined potential at one point in the circuit and in another stable state in response to another potential at that point, first and second biasing means each operable to tend to place said point at said other potential, third biasing means tending to place said point at said predetermined potential, an input, feedback means for the flip-flop circuit, means responsive to an input signal or to a signal on the feedback means for cancelling the effect of the first biasing means, means controlled by the input which normally cancels the effect of the second biasing means but does not do so when there is an input signal, and additional means which cancels the effect of the second biasing means for a limited period at the beginning of the stable state during which said point has said predetermined potential.

7. A counter circuit as defined by claim 6 in which the last-named means includes delay means which is energized during that stable state when said point has said another potential and continues to deliver potential after the flip-flop circuit shifts its state.

8. A counter circuit as defined in claim 7 in which the means controlled by the input and which normally cancels the effect of the second biasing means includes delay means whereby the cancellation continues after cessation of the input signal.

9. In a counter circuit; a transformer having a center-tapped primary; a center-tapped source of alternating current; a first rectifier connecting one side of said source to one side of said primary; a second rectifier connecting the other side of said source to the other side of said primary; output means responsive to flux changes in said transformer; an input; and means connected to said input, to the center-taps of said primary and of said source, and to the output means for effecting a potential difference between said center-taps in response to every alternate input signal at said input whereby current varies in said primary and produces a flux change in the transformer, said last-named means including means for placing the center-taps at substantially the same potential in response to the remaining input signals at said input whereby there is no flux change in the transformer; said rectifiers being connected with such polarity that when there is said difference in potential between said center-taps the rectifiers will alternately conduct current through opposite sides of the primary winding.

10. In a counter circuit, a transformer having a primary, a source of alternating current, said transformer having an output responsive to flux changes produced by said primary, an input, means for applying a series of input pulses to said input, and means coupled to both said input and said output and responsive to every alternate one of the input pulses in said series for effectively connecting said source and said primary together whereby alternating current will flow in said primary and produce a flux change, said last-named means including means responsive to each of the remaining input pulses in said series for effectively disconnecting the primary winding from said source.

11. In combination, a bistable circuit including a control line, a source of input pulses, means connecting said source of control line, said bistable circuit including means responsive to the potential state of said control line for producing a first stable output in response to a first potential on said control line and for producing a second stable output in response to a second potential on said control line, and means for controlling the effect of pulses from said input source on the potential state of said control line comprising first, second, and third bias means, means coupling said input source to said first bias means whereby said pulses from said input source are selectively operative to control the output of said first bias means, a delay line, means coupling the output of said bistable circuit through said delay line to said second bias means whereby the output state of said bistable circuit is selectively operative to control the output of said second bias means in accordance with an output state previously established, said first and second bias means each being normally operative to maintain said first potential on said control line, and third bias means responsive to the outputs of said first and second bias means for shifting the potential on said control line from said first potential to said second potential in response to predetermined variations in the outputs of said first and second bias means.

12. In a counter circuit, a transformer, a source of alternating potential, control means including a control line for coupling said source to said transformer whereby said source is effectively connected to said transformer when said control line has a first potential thereon and said source is effectively disconnected from said transformer when said control line has a second potential thereon, output means connected to said transformer for producing an output of one magnitude in response to said first potential and another magnitude in response to said second potential, means for controlling the potential on said control line comprising a plurality of biasing sources, signal responsive means, output responsive means, means including said signal responsive means and said output responsive means for selectively coupling said biasing sources to said control line, and a source of control signals coupled to said signal responsive means, said signal responsive means and said output responsive means responding respectively to a first control signal and an output of said one magnitude and to each alternate control signal thereafter and the coexisting output of said one magnitude for connecting a selected one of said plurality of biasing sources to said control line thereby to effect said first potential on said control line, said signal responsive means also including means operative in response to a second control signal, an output of said other magnitude and each alternate control signal and the coexisting output of said other magnitude thereafter for connecting other selected ones of said plurality of biasing sources to said control line thereby to effect said second potential on said control line.

13. The combination of claim 12 wherein said output responsive means is also responsive to a delayed output signal for connecting a selected one of said plurality of biasing sources to said control line.

References Cited in the file of this patent

UNITED STATES PATENTS

| | | |
|---|---|---|
| 2,644,893 | Gehman | July 7, 1953 |
| 2,644,897 | Lo | July 7, 1953 |
| 2,683,806 | Moody | July 13, 1954 |
| 2,695,381 | Darling | Nov. 23, 1954 |
| 2,719,228 | Auerbach et al. | Sept. 27, 1955 |
| 2,758,208 | Grayson | Aug. 7, 1956 |
| 2,764,688 | Grayson et al. | Sept. 25, 1956 |
| 2,795,696 | Evans | June 11, 1957 |

UNITED STATES PATENT OFFICE

CERTIFICATE OF CORRECTION

Patent No. 2,888,560 May 26, 1959

Robert P. Talambiras

It is hereby certified that error appears in the printed specification of the above numbered patent requiring correction and that the said Letters Patent should read as corrected below.

Column 6, line 48, strike out "of" after "source" and insert instead -- to said --.

Signed and sealed this 5th day of April 1960.

(SEAL)
Attest:

KARL H. AXLINE
Attesting Officer

ROBERT C. WATSON
Commissioner of Patents